United States Patent Office 3,689,253
Patented Sept. 5, 1972

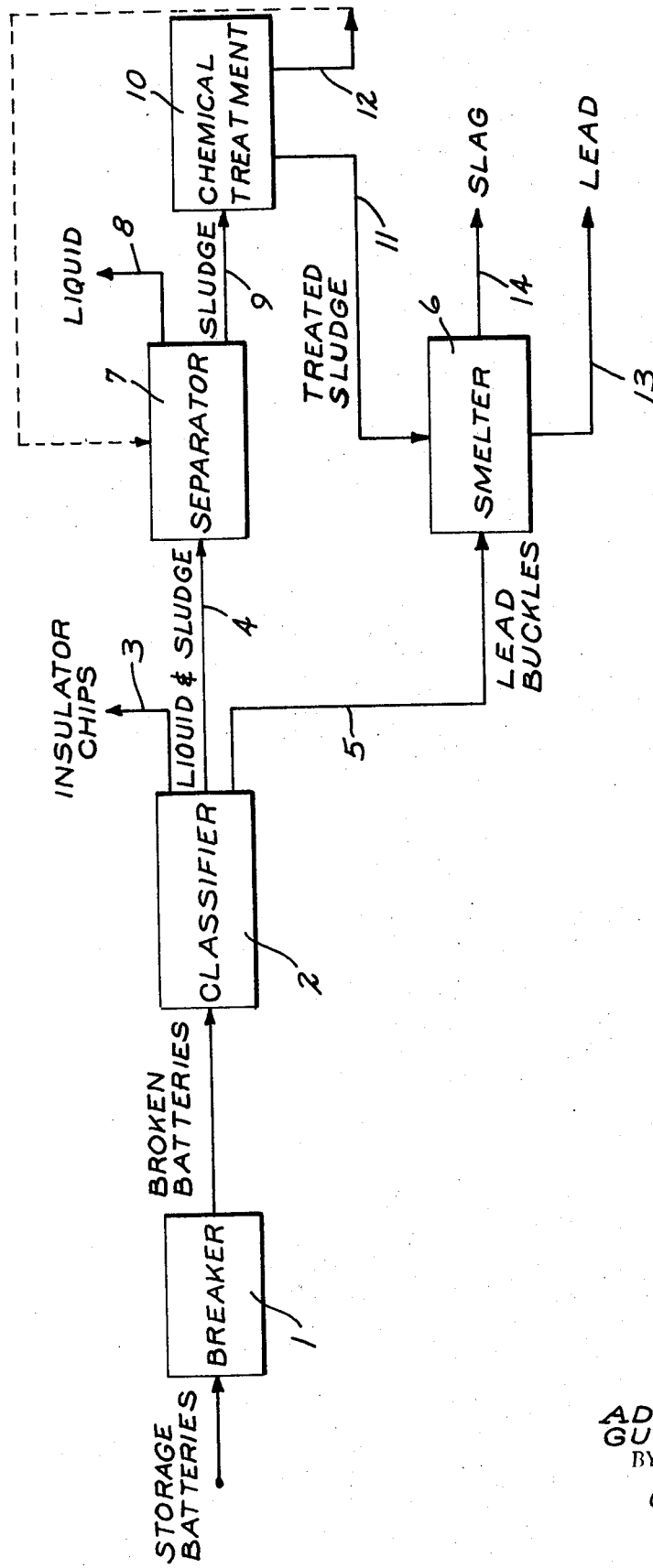

3,689,253
RECLAIMING LEAD FROM STORAGE BATTERIES
Adrian C. Dorenfeld and Gust Bitsianes, Minneapolis, Minn., assignors to Minerals Technology Corporation, Minneapolis, Minn.
Filed Aug. 27, 1970, Ser. No. 67,506
Int. Cl. C22b 13/00
U.S. Cl. 75—77     7 Claims

ABSTRACT OF THE DISCLOSURE

Lead is recovered from storage batteries by a process that involves breaking the batteries into small pieces, separating the broken batteries into: (a) insulator chips; (b) lead buckles or fragments; and (c) sludge containing lead sulphate. The sludge, now substantially free of insulator chips and lead buckles, is mixed with aqueous sodium carbonate or the like with agitation to produce a reaction product that can be easily smelted with carbonaceous reducing agents and simple fluxes at temperatures from 900°–1050° C.

BACKGROUND OF THE INVENTION

Lead storage batteries are used in increasing numbers particularly for automotive purposes. Such storage batteries ordinarily consist of an outer casing of an insulating material such as plastic, hard rubber or the like. Additional insulating material is used to define a series of cells within the outer casing of the storage battery. Within these cells are a plurality of lead plates which are suspended in battery acid contained in the cells. The lead plates and other component parts of storage batteries are frequently sealed in place with hot melt adhesives such as tar or the like.

When lead storage batteries are worn out, it is generally considered that the lead plates and related lead parts are the only parts of the batteries having substantial monetary value as scrap. Although the lead can be recovered by smelting the entire battery, such a process requires high temperatures that result in high fume losses, and the sulphur present in the battery acid and sludge produces considerably matte. Consequently, those interested in recovering the lead in used storage batteries have proceeded to crack the battery cases in order to remove the plates, thereby obtaining a product which can be more easily refined. The battery plates recovered in this manner are coated with a sulphur-containing sludge and many years ago it was proposed to chemically remove the sulfur from the battery plates by soaking the battery plates in alkaline solution for several days after first washing the plates with water to remove as much free acid as possible. However, such a process is inefficient by today's standards in that the time (and cost) of removing the sulphur from the surface of the plates is too great. Illustrative of such prior are processes in U.S. Pat. 2,146,294 and a subsequent article by the patentee entitled "How to Smelt Battery-Plate Scrap," Engineering and Mining Journal, 145 (March 1944) p. 80 et seq.

More recently, apparatus has been developed for breaking storage batteries into small pieces and separating the broken batteries into three components, i.e. insulator chips, lead buckles, and sludge (primarily a lead sulphate, lead oxide mixture). Such equipment is described in U.S. Pat. 3,300,043. That patent is primarily concerned with recovering the lead in the broken plates and other related lead parts (e.g. terminals), and treats the insulator chips as a waste material. It has not been common to chemically treat either the lead buckles or the sludge after separation, rather they are merely smelted together in a high temperature smelting operation with the resulting fumes, matte, and slag. High lead recoveries (as a percent of total lead available) are generally possible only when resmelting techniques are used.

SUMMARY OF THE INVENTION

We have discovered that the extent of lead recovery from storage batteries can be substantially increased and the attendant economics made commercially attractive by a process that involves breaking the used storage batteries into small pieces, separating the broken storage battery into its component parts (i.e. insulator chips, lead buckles and sludge) and thereafter chemically treating the sludge, after separation from the insulator chips and lead buckles, to convert the lead in the sludge into a form which can be readily refined. In this manner, both the lead buckles (i.e. the lead fragments from the plates and related parts) and the lead present in the sludge can be recovered in high yields by a simple one-step smelting operation with the attendant economic advantages.

THE DRAWING

The drawing is a simplified flow diagram of the process of the invention.

DETAILED DESCRIPTION

The process as shown in the drawing

As shown in the drawing, lead storage batteries are broken in breaker 1. The broken batteries are then classified in classifier 2 to form insulator chips 3, liquid and sludge 4 and lead buckles 5. The lead buckles can then be smelted in smelter 6, either alone or mixed with treated sludge (as hereinafter described). The liquid and sludge 4 are then passed to separator 7 where liquid 8 is separated from sludge 9. The sludge 9 is then chemically treated in vessel 10 to thereby produce a treated sludge 11 and a liquid phase 12. The liquid 112, which is alkaline in nature, can optionally be recycled to separator 7 to aid in acid neutralization and otherwise. Treated sludge 11 is then smelted in smelter 6 to thereby produce refined lead 13 and slag 14. Lead 13 recovered from treated sludge 11 tends to be quite low in antimony content as contrasted with lead recovered from lead buckles 5.

Breaking batteries

The first step in the process of the present invention is to break a storage battery into a number of small pieces. The size of the pieces will vary considerably, but the process is more readily performed if the size of the pieces is more uniform (e.g. 1–10 cm. in their greatest dimension). The batteries can be broken by impact (as in a hammer mill), by guillotine, by crushing, and the like. Since tiny insulator chips are difficult to separate from the lead buckles and sludge, processes which tend to produce very small chips of insulating material are not preferred although they can be used. Pieces of from 2–6 cm. in their maximum dimension are preferred.

Classifying the broken batteries and separating the sludge

The second step in the process of this invention is classifying the broken storage batteries into at least three components. The first comprises the relatively small fragments of lead from the plates and related parts which are referred to herein as "lead buckles." Such fragments are typically 1–8 cm. (e.g. 2–6 cm.) in their largest dimension. The second component comprises the insulator chips. The third component is the battery acid and sludge.

This classifying process can be performed mechanically and the equipment shown in U.S. Pat. 3,300,043 is well suited for this purpose. In classifying or separating the pieces of the broken batteries, the broken parts should be washed with water or an aqueous solution (e.g. a cleaning solution). The sludge and water are removed together as a dilute slurry and then the sludge is optionally and preferably separated from the accompanying water. This can be performed by simply permitting the sludge to settle and then removing the supernatant liquid.

Chemical treatment of the sludge

Next, the sludge (which is a mixture of lead sulphate and lead oxides) in mixed with an alkaline solution, preferably a sodium carbonate solution, and agitated by either mechanical means or percolation or by air lift methods. Although an excess of the alkaline solution can be used, stoichiometric amounts are normally adequate, particularly when using aqueous sodium carbonate at optimum liquid/solid ratio. Within less than six hours (e.g. less than four hours) under ambient conditions, usually in 0.1–2 hours (e.g. about one hour), the lead sulfate/lead oxide mixture which forms the sludge is converted almost completely into what appears to be a lead carbonate/lead oxide mixture. Under our conditions of treatment 0.5–1.5 hours appears optimum. When longer times are used, the degree of sulfur extraction tends to drop. In any event, the sulphur present in the sludge as lead sulphate is almost completely removed from the sludge by the alkaline treatment. The resulting solid material, believed to be lead carbonate and possible lead oxide, is then separated from the treating solution. This solid material (i.e. "treated sludge") can be easily smelted with carbonaceous reducing agents and simple fluxes, usually at temperatures below 1050° C. Temperatures of 900° C. and below are preferred. 900° C. works well.

The temperature at which the chemical treatment is performed does not appear to be a significant factor within the range of 20°–100° C. and, consequently, room or ambient temperature is preferred (i.e. 20°–30° C.).

Although sodium carbonate is the perferred treating agent, other water soluble alkali metal salts or hydroxides can be used. Suitable treating agents include sodium hydroxide, sodium bicarbonate, potassium carbonate, potassium hydroxide, and potassium bicarbonate.

The present invention is further illustrated by the following examples. In each of these examples, lead automobile storage batteries were broken and classified using apparatus constructed and operated according to U.S. Pat. 3,300,043. Liquid and sludge were separated from each other by gravity in a settling tank wherein the sludge was removed from the bottom of the tank and the supernatant liquid was removed from the top of the tank and discarded. The sludge was then dried for convenience in laboratory handling. Unless otherwise indicated, all parts and percentages are by weight.

EXAMPLE I 110 grams of dried battery sludge was vigorously agitated with a 11.7% aqueous sodium carbonate solution using a liquids/solids ratio of 3:1. This provided approximately the theoretical equivalent of soda needed to convert the lead sulfate in the sludge into lead carbonate. Agitation was carried out in a plastic container using a laboratory shaker and was continued for one hour, after which the chemically treated sludge was removed by filtration, washed thoroughly with tap water, and then dried at 110° C.

The treated sludge was later mixed with a simple flux mixture containing soda, potash, and borax. This mixture was then smelted with a small amount of carbonaceous reductant at 900° C. A heating period of 25 minutes sufficed to produce a fluid slag/metal system which was readily poured to yield a clean 36.1 gram lead button. The amount of lead recovered represented about 98.9% of the lead originally present in the untreated sludge.

EXAMPLE II

In Example II, the procedure of Example I was followed except that sodium hydroxide was used as the desulfurizing or treating agent. 8.8% aqueous sodium hydroxide was used and the treating agent/sludge mixture was formed at 3:1 liquid to solid ratio.

The smelting procedure of Example I was repeated and the lead recovery was in excess of 98% of the lead present in the untreated sludge.

EXAMPLE III

In this example, the procedure of Example I was followed using potassium carbonate as the desulfurizing or treating agent. A 15.2% aqueous potassium carbonate solution was used at a 3:1 liquid to solid ratio.

The smelting procedure of Example I was repeated and lead recovery was again in excess of 98% of the lead present in the untreated sludge.

What is claimed is:

1. The process which comprises:
   (a) breaking lead storage batteries into small pieces;
   (b) classifying the small pieces into lead buckles, insulator chips, and a sludge-containing stream;
   (c) treating said sludge at a temperature within the range of 20°–100° C. for less than six hours with an aqueous treating solution to form a treated sludge, said solution containing a treating agent selected from the group consisting of water soluble alkali metal salts and alkali metal hydroxides;
   (d) separating treated sludge from said treating solution; and
   (e) smelting said treated sludge.

2. Processes of claim 1 wherein said sludge is treated by mixing said sludge with aqueous sodium carbonate and wherein the time of treatment is 0.1–2 hours.

3. Processes of claim 2 wherein said treated sludge is mixed with said lead buckles and the mixture is smelted.

4. Processes of claim 2 wherein the time of treatment is about from 0.5–1.5 hours and wherein the treated sludge is smelted separate from the lead buckles.

5. The process which comprises:
   (a) breaking lead automobile storage batteries into small pieces having, in general, a maximum dimension of 2–6 cm.;
   (b) classifying the small pieces into lead buckles, insulator chips and a sludge-containing stream;
   (c) smelting the lead buckles;
   (d) separating liquid from said sludge containing stream;
   (e) mixing sludge with a member selected from the group consisting of aqueous solutions of sodium hydroxide, potassium hydroxide, sodium carbonate, potassium carbonate, sodium bicarbonate, and potassium bicarbonate for 0.5–1.5 hours;
   (f) separating treated sludge and from the mixture of step "e"; and
   (g) smelting the treated sludge.

6. Processes of claim 5 wherein aqueous solution from step "e" is recycled by adding it to the sludge containing stream prior to completing step "d."

7. The process of claim 1 wherein the treated sludge is smelted with a carbonaceous reducing agent and a flux at a temperature of less than 1050° C.

References Cited

UNITED STATES PATENTS

| | | | |
|---|---|---|---|
| 3,300,043 | 1/1967 | Adsit | 75—77 UX |
| 2,146,294 | 2/1939 | Hayward | 75—77 |
| 3,393,876 | 7/1968 | Elmore | 75—77 X |

HERBERT T. CARTER, Primary Examiner

U.S. Cl. X.R.

75—120, 63, 65